United States Patent [19]

Ohara et al.

[11] Patent Number: 4,467,367
[45] Date of Patent: Aug. 21, 1984

[54] HALF-TONE PICTURE RECORDING DEVICE

[75] Inventors: Yuji Ohara; Masahiro Ohnishi, both of Saitama, Japan

[73] Assignee: Fuji Photo Film Co., Ltd., Kanagawa, Japan

[21] Appl. No.: 258,239

[22] Filed: Apr. 28, 1981

[30] Foreign Application Priority Data

Apr. 30, 1980 [JP] Japan ............................... 55-57266

[51] Int. Cl.³ ............................................. H04N 1/22
[52] U.S. Cl. .................................. 358/298; 358/302
[58] Field of Search .............. 358/298, 296, 302, 283; 346/76 L; 369/116, 106, 125, 58

[56] References Cited

U.S. PATENT DOCUMENTS

| | | | |
|---|---|---|---|
| 3,197,558 | 7/1965 | Ernst | 358/283 |
| 4,001,492 | 1/1977 | Suzuki | 358/298 |
| 4,028,732 | 6/1977 | Salter | 369/116 |
| 4,080,634 | 3/1978 | Schreiber | 358/302 |
| 4,375,064 | 2/1983 | Ohara | 358/298 |

Primary Examiner—Alan Faber
Attorney, Agent, or Firm—Sughrue, Mion, Zinn, Macpeak and Seas

[57] ABSTRACT

A half-tone picture recording device with which half-tone images are accurately recorded. With the number of pulses applied during each sampling period being fixed, a light beam such as laser source is subjected to binary modulation and scanned on a photosensitive material to record the image of a half-tone picture thereon. Input signal levels representing the picture to be recorded are converted into a number of pulses for each sampling period by representing numbers of pulses to be applied during any particular sampling period with these values determined in accordance with output density levels with input signal levels, necessary exposure with output density levels, and pulse numbers with necessary exposure.

8 Claims, 15 Drawing Figures

HALF-TONE PICTURE RECORDING DEVICE

BACKGROUND OF THE INVENTION

The present invention relates to a device which uses a light beam to record or reproduce the image of a picture such as a photograph having half-tones (hereinafter referred to as "a half-tone picture or image" when applicable) on a photosensitive material.

More specifically, the invention relates to a device for recording a half-tone image by subjecting a light beam to binary (two-valued or ON-OFF) modulation and scanning it on a photosensitive material wherein half-tones are reproduced with high fidelity and high accuracy taking into account the characteristics of the photosensitive material employed, the density range of an original picture and, if necessary, the characteristics of a signal transmission system.

The present applicant has disclosed in U.S. patent application Ser. No. 214.815, filed Dec. 9, 1980 (corresponding to Japanese Patent Application No. 168565/1979) a system with which the image of a picture having half-tones can be recorded or reproduced by sampling input signals with the aid of sampling pulses. By applying to a semiconductor laser oscillator or the like pulses outputted during the sampling period with the number of pulses (pulse number) or pulse width controlled according to the levels of the input signals.

In order to further improve this system, an object of the present invention is to provide a recorder which reproduces the image of a picture with half-tones with high fidelity and high accuracy taking into account the characteristics of the photosensitive material employed, the density range of an original picture, and if necessary, the characteristic of a signal transmission system.

SUMMARY OF THE INVENTION

Provided according to the invention is a half-tone picture recording device in which, with the number of pulses outputted during each sampling period controlled, a light beam is subjected to binary modulation and scanned on a photosensitive material to record the image of a half-tone picture thereon, in which according to the invention, input signal levels are converted into numbers of pulses N (N being an integer) by a conversion circuit in which the results of calculations for at least the following characteristics have been stored:

(1) output density levels with input signal levels,
(2) necessary exposure with output density levels, and
(3) pulse numbers N with necessary exposure.

Alternatively, if the picture recording device is such that the number of pulses applied during each sampling period is controlled (fixed) and the width of the pulses is variable, the input signal levels are converted into pulse widths using the same conversion circuit.

DESCRIPTION OF THE PREFERRED EMBODIMENTS

A preferred embodiment of the invention will be described with reference to the accompanying drawings. First, a case where, with the number of pulses outputted during each sampling period controlled, a light beam is subjected to binary modulation and scanned on a photosensitive material to record a half-tone image thereon will be described.

Figure 1A:
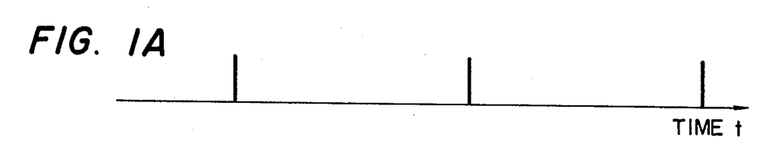
FIGS. 1A–1D and 2 are diagrams showing variations in intensity with time of a light beam which is subjected to pulse-number modulation.
Figure 1B:
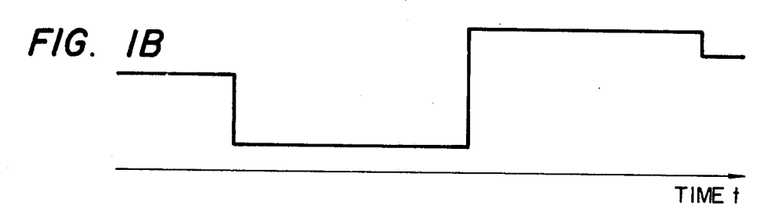
Figure 1C:
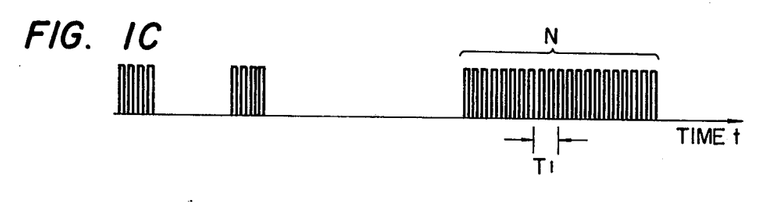
Figure 1D:
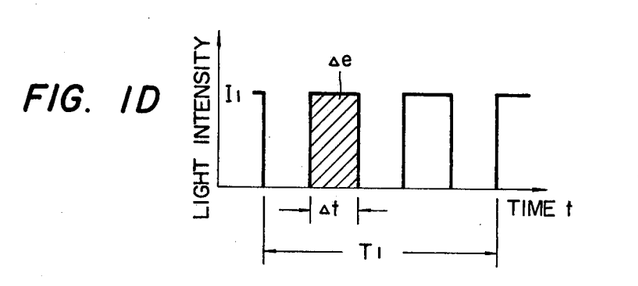

In general, in a device such as for instance a facsimile system in which the image of a picture is recorded by scanning a light beam on a photosensitive material, the input signals thereto are time-series signals which are obtained by subjecting the original picture to photoelectric conversion by scanning and decomposing the picture into a number of picture elements using a sampling process. In this connection, the amount of exposure for each of the picture elements forming the original picture is controlled by the number of pulses which are outputted during each sampling period. As indicated in FIG. 1D, a unitary exposure $\Delta e$ per pulse is:

$$\Delta e = I_1 \cdot \Delta t$$

If the number of pulses provided according to the level of an imput signal of a picture element is represented by N, then the total optical energy applied to the picture element, i.e. the exposure E is:

$$E = N \cdot \Delta e. \tag{1}$$

Figure 2:
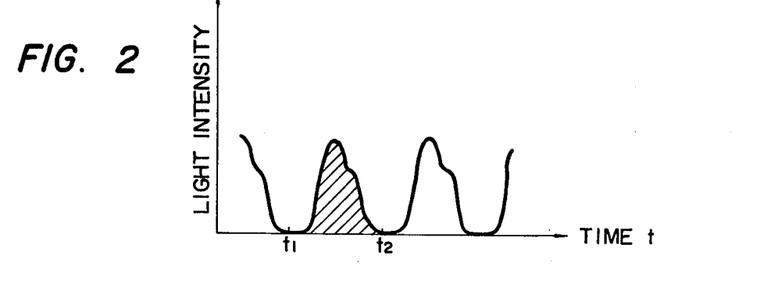

If a signal relating the variations in intensity with time of the light beam which is pulse-number modulated is distorted as shown in FIG. 2 due to characteristics of the modulation circuit for instance, instead of being square as shown in FIG. 1D, the unitary exposure per pulse $\Delta e$ is:

$$e = \int_{t_1}^{t_2} I(t)dt$$

However, such a distortion does not at all affect the quality of a recorded image.

Figure 3:
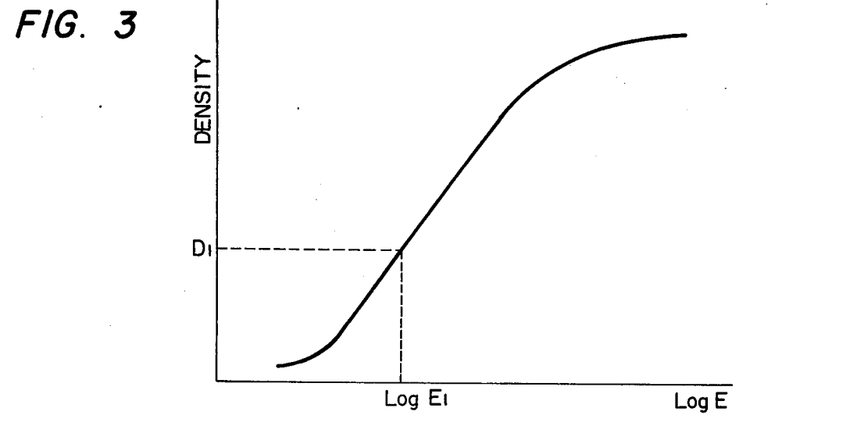
FIG. 3 is a graphical representation indicating an example of the characteristic curve of a photosensitive material.

A typical characteristic curve of a photosensitive material, used in recording the image of a picture, namely, an exposure vs. density characteristic curve is shown in FIG. 3. An exposure method, such as the pulse-number modulation method used in the preferred embodiment of the invention is different from the so-called "printing exposure method" usually employed in the field of photography in that the former has a shorter processing time, higher repetition and luminance than the latter and may involve what is known in the art as reciprocity law failure. Accordingly, it is desirable that the characteristic curve employed in the embodiment of the invention be prepared by measuring data under the conditions that the light beam is actually scanned on the photosensitive material to record the image thereon. FIG. 3 is a graph which illustrates the fact that if the total exposure to a picture element is represented by $E_1$, the density which is provided on the photosensitive material, as determined by the developing process, etc., is $D_1$.

Figure 4:
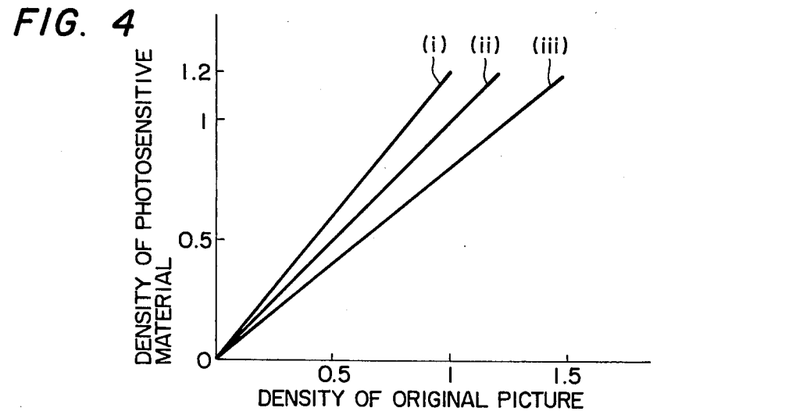
FIG. 4 is a graphical representation for a description of the relations between originals of different density range and the output density ranges of a photosensitive material.

In the case where, as in a facsimile system, the input signal is obtained by subjecting an original picture to scanning and photoelectric conversion prior to recording and a light beam modulated therewith is applied to a photosensitive material to record the image of the original picture, sometimes the density range of the original picture may not correspond to the density range of the photosensitive material in the ratio of 1:1. In this case, the quality of the reproduced image is, in general, improved by making the two density ranges correspond to one another. For instance, if the density range of the original picture includes a background density of about 0.1 to 1.0 as in FIG. 1A, a background density of 1.2 as in FIG. 1B, and a background density of 1.5 as an in FIG. 1C and, the density of the employed photosensitive material ranges from a fog density to 1.2, then the density ranges of the original picture and the photosensitive material can be placed in agreement with each other as indicated by curves (i), (ii) or (iii) in FIG. 4.

On the other hand, in a higher-speed facsimile system or the like, data is subjected to band compression in order to reduce the period of time required for transmitting the image of the original picture. Also in electrically transmitting the image of an original picture such as a photograph having halftones, the input signals are quantized into plural bit signals which are subjected to band compression before being transmitted in order to reduce the period of time of using the transmission line with the result that the transmission cost per original picture is decreased.

In such a case, input signals to the recorder are quantized plural bit signals. Therefore, in order to reproduce the half-tones of an original picture with high fidelity by applying a pulse-number-modulated beam onto a photosensitive material, it is necessary to convert the levels of the input signals into pulse numbers N taking into account the characteristics of the photosensitive material, the density range of the original picture, and if necessary, the characteristic of the transmission line.

Figure 5:
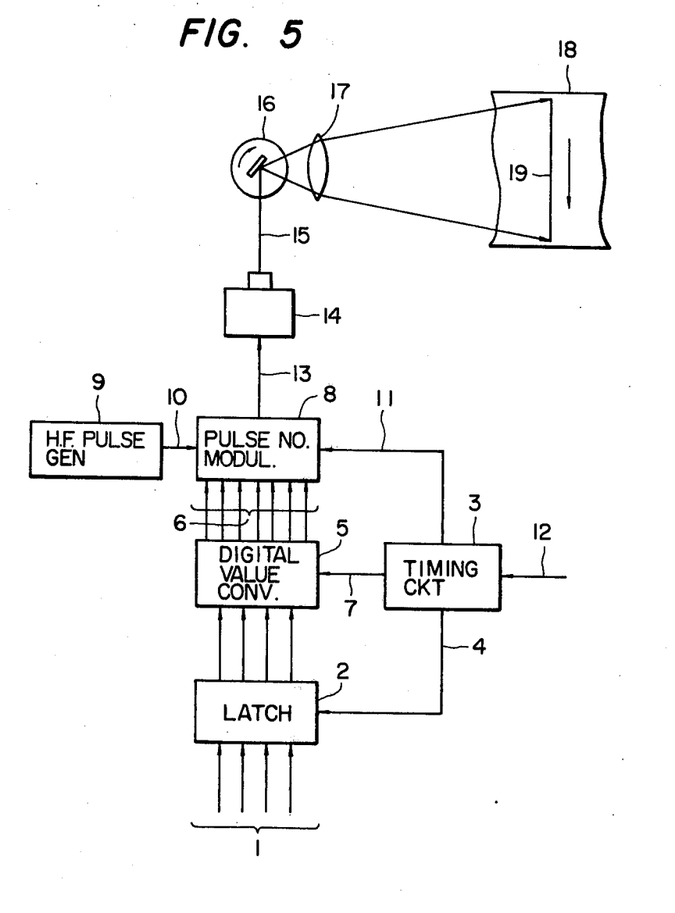
FIG. 5 is an explanatory diagram for a description of a preferred embodiment of the invention employing a pulse-number modulation circuit.

FIG. 5 is an explanatory diagram for a description of a preferred embodiment of the invention. In FIG. 5, reference numeral 1 designates an input signal which is obtained by quantizing a sensed signal from a picture to be recorded into a 4-bit signal. The 4-bit input signal is applied to a latch circuit 2 and latched therein upon the application of a control pulse 4 outputted by a timing circuit 3. The input signal thus latched is supplied to a digital value conversion circuit 5. The circuit 5 may be implemented with a PROM (programmable read-only memory) in which 7-bit output values are stored for levels of the 4-bit input signals. More specifically pulse numbers N corresponding to the levels of the input signals are stored therein. The digital value conversion circuit 5 produces an output corresponding to the 4-bit input upon application of a control pulse 7 outputted by the timing circuit 3. The output 7-bit digital data of the digital value conversion circuit 5 is applied to a pulse-number modulation circuit 8 to which the output high-frequency pulses 10 from a high-frequency pulse generator 9 and the output control pulse 11 from the timing circuit 3 are applied. The pulse-number modulation circuit 8 outputs high frequency pulses the number of which is equal to the value of the 7-bit output signal 6 of the digital value conversion circuit 5 in each sampling period. An example of the circuits 2, 3, 5, 8 and 9 is described in detail in the specification of U.S. Pat. application Ser. No. 214,815, filed Dec. 9, 1980 (corresponding to Japanese Patent Application No. 168565/1979) and now U.S. Pat. No. 4,395,766. The control pulses 4, 7 and 11 provided by the timing circuit 3 are in synchronization with a sampling pulse 12 applied to the timing circuit 3 and with a sampling pulse generated by the timing circuit 3 itself and are used to control the operational sequence of the latch circuit 2, the digital value conversion circuit 5 and the pulse-number modulation circuit 8. In the above-described embodiment, the frequency of the sampling pulse is 100 KHz.

The pulse-number modulation output of the pulse-number modulation circuit 8 is applied to a semiconductor laser oscillator 14. The laser beam 15 of the semiconductor laser oscillator 14 is deflected by a galvanometer mirror 16, and focused by a lens 17 onto a photosensitive material 18 so that a scanning line 19 is formed on the photosensitive material 18. At the same time, the photosensitive material 18 is moved perpendicularly to the scanning line 19. In this manner, an image is reproduced on the photosensitive material 18.

The contents stored in the digital value conversion circuit 5, forming one of the features of the invention, will be described in detail. It is assumed that the density range in which the photosensitive material employed in the embodiment is from a fog density of 0.05 to 1.2, and that the range of the standard imput signal to the recorder, i.e. the density range of the standart original picture is from a white background density to 1.5. Furthermore, it is assumed that the input signal is obtained by quantizing a density of a picture into a 4-bit signal as described above and that the levels of the input signals correspond to the density values of the original picture as indicated in Table 1 below:

TABLE 1

| Input signal level | Input signal bit value | | | | Original picture density |
|---|---|---|---|---|---|
| | MSB | | | LSB | |
| 0 | 0 | 0 | 0 | 0 | White background density |
| 1 | 0 | 0 | 0 | 1 | 0.1 |
| 2 | 0 | 0 | 1 | 0 | 0.2 |
| 3 | 0 | 0 | 1 | 1 | 0.3 |
| 4 | 0 | 1 | 0 | 0 | 0.4 |
| 5 | 0 | 1 | 0 | 1 | 0.5 |
| 6 | 0 | 1 | 1 | 0 | 0.6 |
| 7 | 0 | 1 | 1 | 1 | 0.7 |
| 8 | 1 | 0 | 0 | 0 | 0.8 |
| 9 | 1 | 0 | 0 | 1 | 0.9 |
| 10 | 1 | 0 | 1 | 0 | 1.0 |
| 11 | 1 | 0 | 1 | 1 | 1.1 |
| 12 | 1 | 1 | 0 | 0 | 1.2 |
| 13 | 1 | 1 | 0 | 1 | 1.3 |
| 14 | 1 | 1 | 1 | 0 | 1.4 |
| 15 | 1 | 1 | 1 | 1 | 1.5 |

Figure 6:
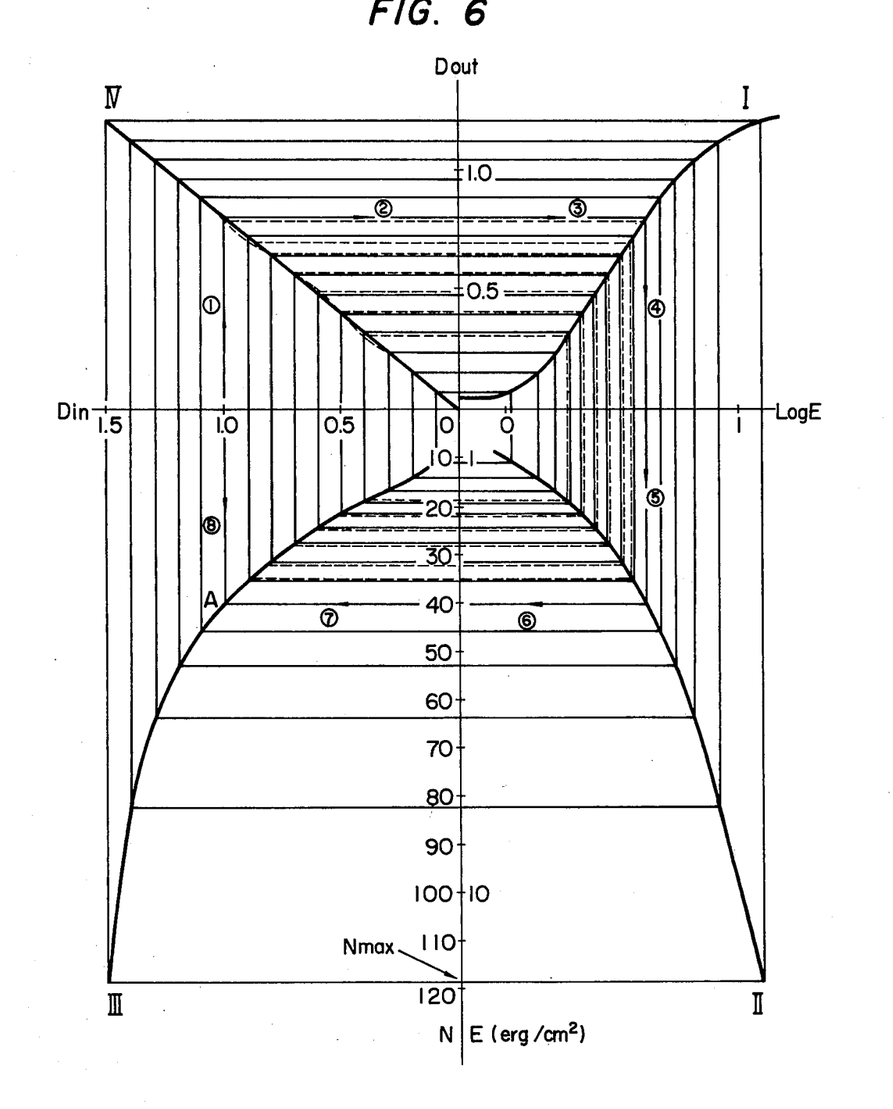
FIG. 6 is a diagram for a description of a method of determining pulse-numbers for input signal levels.

In FIG. 6, curve I is an example of a characteristic curve of a photosensitive material which may be employed with the invention, curve II indicates exposure E ($erg/cm^2$) with exposure logarithmic value (log E), curve III indicates input signal level (represented by the original picture density), with pulse number, and curve IV indicates original picture density with reproduced image density.

The contents which should be stored in the digital value conversion circuit 5 are derived from curve III in FIG. 6. Curve III is obtained as follows:

(i) The photosensitive material is subjected to sensitometry measurements under conditions which are as similar to those of the actual recorder as possible. A characteristic curve is drawn in the first quadrant from the results of the sensitometry measurement.

(ii) The relations between exposure E (erg/cm$^2$) and the logarithmic values of the exposures (log E) are plotted in the second quandrant.

(iii) The relations between input original picture densities ($D_{in}$) and output photosensitive material densities ($D_{out}$) are plotted in the fourth quadrant. It is not always necessary that these densities be in a linear relation.

(iv) After the above-described three steps have been accomplished, for each of the original picture densities $D_{in}$ an exposure E to be applied to the photosensitive material is obtained as indicated by (1)→(2)→(3)→(4)→(5)→(6)→(7) in FIG. 6. By way of example, the case of $D_{in}=1.0$ is indicated by the arrows. The intersection A of the exposure E thus obtained and (8) is determined. The intersections A thus obtained are plotted in the third quadrant.

(v) The curves indicated by the solid lines in FIG. 6 have been drawn through the above-described steps (i) through (iv). (However, in this step, numerals representing pulse numbers N are not plotted in FIG. 6.)

(vi) Then, the pulse numbers N corresponding to the density levels are determined according to equation (1), $E = N \cdot \Delta e$. In this connection, the relation between the unitary exposure $\Delta e$ per pulse and the pulse number N will be described with reference to FIG. 7 in more detail.

Figure 7:
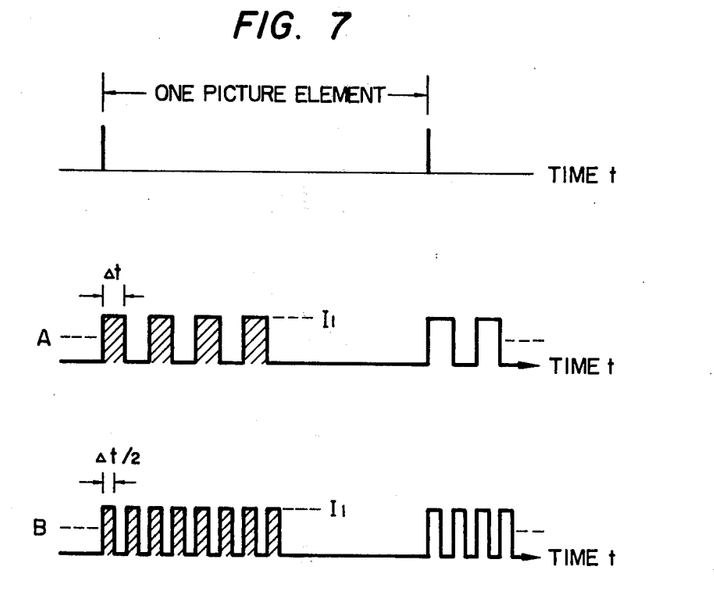
FIG. 7 including A and B, is a diagram for a description of the relation between the frequencies of high frequency pulses and the pulse numbers.

FIG. 7 shows variations with time in intensity of two different pulse-number-modulated light beams (indicated by A and B, respectively) which provide a necessary exposure for the density level of a picture element. For A, the unitary exposure per pulse is $\Delta e_A = I_1 \cdot \Delta t$ and the total exposure of one picture element is $E_A = N_A \cdot \Delta e_A = 4 \, I_1 \cdot \Delta t$. For B, the unitary exposure per pulse is $e_B = I_1 \cdot (\Delta t/2) = \Delta e_A/2$ and the total exposure of one picture element is $E_B = N_B \cdot \Delta e \cdot B = 8 \, I_1 \cdot (\Delta t/2) = 4 \, I_1 \cdot \Delta t = E_A$. The frequency ratio of the high frequency pulses is $F_A : F_B = 1:2$.

As is apparent from the above description, if the modulated light beams are equal in intensity (being $I_1$ in this example), the exposure per pulse depends on the pulse width of each pulse ($\Delta t$ in A, and $\Delta t/2$ in B). In other words, the exposure per pulse depends on the frequency of the high frequency pulses ($F_A$ in A, and $F_B$ in B). The pulse-number necessary for providing an exposure for the density level of a picture element ($N_A$ in A, and $N_B$ in B) depends on the frequency of the high frequency pulses.

On the other hand, the frequency F of the high frequency pulses relates to the frequency $f_s$ of the sampling pulses as indicated in the following expression:

$$F = N_{max} \cdot f_s \qquad (2)$$

where $N_{max}$ is the pulse number which provides a necessary exposure for the maximum density level.

In the preferred embodiment, the frequency $f_s$ of the sampling pulses is set at 100 KHz, the frequency of the high frequency pulses is 12 MHz, and the unitary exposure per pulse $\Delta e$ is 0.1 erg/cm$^2$. Under these conditions, the pulse numbers N which provide necessary exposures for the density levels are defined as indicated in Table 2 and are marked on the vertical axis in the third quandrant III in FIG. 6.

In Table 2, each necessary exposure E is approximated with an exposure performed with N pulses for the necessary exposure which is obtained according to steps (i) through (v) described above or obtained from the solid lines in FIG. 6. The densities on the photosensitive material which are provided by exposure for the input signal levels in Table 2 are represented by the broken lines in FIG. 6. It can be understood from the fourth quandrant IV in FIG. 6 that the densities are approximated, as indicated by the broken lines, with very small errors for the relations (the solid lines) which are required between the original picture densities $D_{in}$ and the reproduced image densities $D_{out}$.

TABLE 2

| Input signal level | Necessary exposure E (erg/cm$^2$) | Necessary pulse number N |
|---|---|---|
| 0 | 0 | |
| 1 | 1.1 | 0 |
| 2 | 1.4 | 11 |
| 3 | 1.7 | 17 |
| 4 | 1.9 | 19 |
| 5 | 2.2 | 22 |
| 6 | 2.5 | 25 |
| 7 | 2.8 | 28 |
| 8 | 3.2 | 32 |
| 9 | 3.5 | 35 |
| 10 | 4.0 | 40 |
| 11 | 4.6 | 46 |
| 12 | 5.3 | 53 |
| 13 | 6.4 | 64 |
| 14 | 8.2 | 82 |
| 15 | 11.9 | 119 |

Note: The unitary exposure per pulse is $\Delta e = 0.1$ erg/cm$^2$.

In the preferred embodiment of the invention, the pulse numbers N required for the input signal levels which are obtained as described above are stored in the digital value conversion circuit 5. In response to the input signal levels, the corresponding pulse numbers N are read out of the digital value conversion circuit 5 as a result of which the pulse number modulated laser beam of the semiconductor laser oscillator 14 is applied to the photosensitive material 18 as described above. Thus, the image of the original picture is recorded with half-tones reproduced with a high accuracy.

In the above-described embodiment, the input signal is quantized with respect to the density. However, the input signal may be quantized with respect to the brightness. In this case, pulse numbers N for the input signal levels are calculated according to a procedure which is similar to that described with reference to FIG. 6 and the pulse numbers N thus calculated are stored in the digital value conversion circuit in advance. In this case also, a half-tone image can be reproduced according to the pulse-number modulation.

In the case also where the photosensitive material is not of the negative type characteristic curve indicated in the first quadrant I in FIG. 6 (i.e. it is of the positive type), a half-tone image can be reproduced according to pulse number modulation readily be obtaining pulse numbers N for input signal levels completely the same as in the above-described case. Furthermore, with respect to the characteristics of a signal transmission line in the facsimile system, similarly pulse numbers N for input signal levels which are obtained including various characteristics by applying the technical concept described with reference to FIG. 6 can be stored in the digital value conversion circuit 5. In the case where the input signal is an analog signal, if an analog-to-digital converter is employed to convert the analog signal into a digital signal having a desired quantization bit number so that the digital signal is inputted to the digital value conversion circuit 5, a half-tone image can be reproduced using pulse number modulation.

Next, the case where the beam is subjected to binary modulation by controlling the widths of pulses which are outputted during sampling period and is scanned on a photosensitive material will be described.

U.S. patent application Ser. No. 214,815, filed Dec. 9, 1980 (corresponding to Japanese Patent application No. 168565/1979) filed by the present applicant discloses a system in which input signals are sampled with the aid of sampling pulses and pulses outputted during the sampling period are applied to a semiconductor laser oscillator with the pulse widths being controlled according to the levels of the input signals thus sampled thereby to record or reproduce the image of a picture including half-tones. The technical concept of the invention can be readily applicable to the case where the pulse widths are controlled as described above. That is, this can be achieved by replacing the pulse number modulation circuit 8 in FIG. 5 by a pulse number modulation circuit of the type described in U.S. patent application Ser. No. 214,815 (corresponding to Japanese Patent Application No. 168545/1979).

Figure 8A:
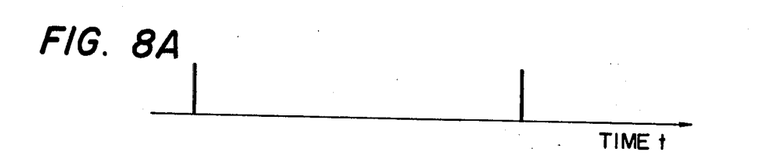
FIGS. 8A–8D, taken together, are an explanatory diagram for a description of the technical concept of the invention applied to the case where a half-tone image is reproduced according to a pulse-width modulation.
Figure 8B:
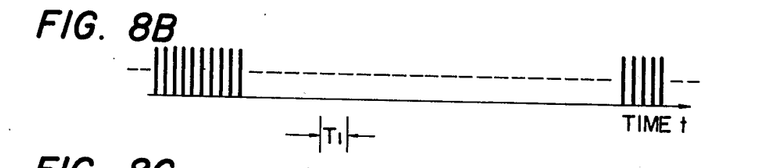
Figure 8C:
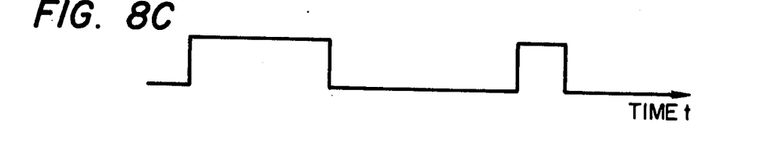

A method of determining an exposure E in this case will be described with reference to FIGS. 8A–8C. FIG. 8A shows sampling pulses, FIG. 8B high frequency pulses, FIG. 8C intensity variations with time of a light beam which is modulated with a pulse signal whose pulse width is controlled by the number N of high frequency pulses, and FIG. 8D, corresponding to a period of time $T_1$, of FIGS. 8B and 8C on an enlarged scale.

In this case, an output pulse width T is represented by the following expression:

$$T = N \cdot \Delta t \tag{3}$$

Figure 8D:
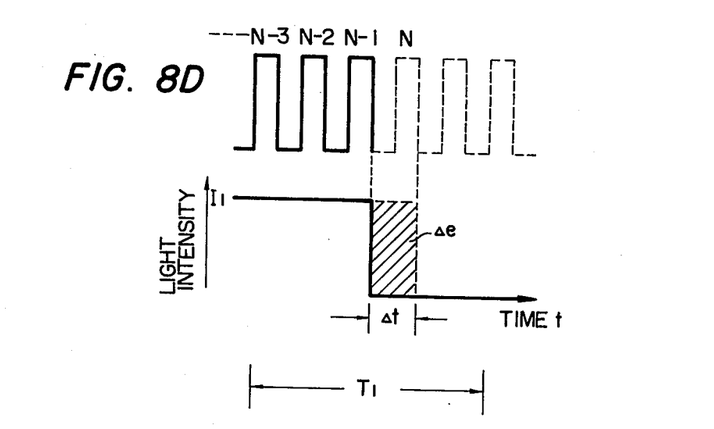

That is, the output pulse width T is the product of the number N of high frequency pulses and the period $\Delta t$ of the high frequency pulses. Therefore, the total exposure E for a picture element is:

$$E = I_1 \cdot T = I_1 \cdot N \cdot \Delta t = N \cdot \Delta e \tag{4}$$

where $\Delta e$ is the increment (shaded in FIG. 8D) of an exposure per high frequency pulse. Here, $\Delta e = I_1 \cdot \Delta t$. Thus, in the case also where a half-tone image is reproduced by controlling the widths of pulses which are outputted during a sampling period, the total exposure E applied to a picture element is controlled by the number N of high frequency pulses as is clear from expression (4) above. Accordingly, if, in this case also, pulse numbers N providing necessary exposure E for input signal levels are calculated and stored in the digital value conversion circuit in advance, as in the above-described pulse number modulation technique, a half-tone image can be reproduced with a high accuracy.

While the invention has been described with reference to a particular photosensitive material, other photosensitive materials including a so-called "heat more recording material" and the like can be used as well for recording half-tone images with the invention.

What is claimed is:

1. A half-tone picture recording device comprising: means for scanning a light beam onto a photosensitive recording material; means for storing values representing numbers of pulses of a predetermined width of said light beam to be applied to said recording medium for corresponding input intensity values; means for modulating said light beam in accordance with output values from said storing means outputted in response to a sequence of input values to said storing means representing the image of a picture to be recorded thereby to record the image of a half-tone picture on said recording medium; and wherein said values stored in said storing means are determined at least in accordance with:
   (a) the relationship between the output density levels of the photosensitive recording material and the input density levels of the input signal;
   (b) the exposure levels of said photosensitive recording material needed to produce each of said output density levels; and
   (c) the number of pulses of said light source needed to produce each of said exposure levels.

2. The half-tone picture recording device of claim 1, wherein said storage means comprises a PROM.

3. A half-tone picture recording device comprising: means for scanning a light beam onto a photosensitive recording material; means for storing values representing the width of pulses of a predetermined number of said light beam to be applied to said recording material for corresponding input intensity values; means for modulating said light beam in accordance with output values from said storing means outputted in response to a sequence of input values to said storing means representing the image of a picture to be recorded thereby to record the image of a half-tone picture on said recording material; and wherein said values stored in said storing means are determined at least in accordance with:
   (a) the relationship between the output density levels of the photosensitive recording material and the input density levels of the input signal;
   (b) the exposure levels of said photosensitive recording material needed to produce each of said output density levels; and
   (c) the widths of pulses of said light source needed to produce each of said exposure levels.

4. The half-tone picture recording device of claim 1 or 3 wherein said input values to said storing means represent the density of a picture to be recorded.

5. The half-tone picture recording device of claim 1 or 3 wherein said input values to said storing means represent the brightness of a picture to be recorded.

6. The half-tone picture recording device of claim 1 or 3 wherein said values stored in said storing means are determined by: subjecting a photosensitive material to be utilized with said recording device to sensitometry measurements; plotting a characteristic curve as a result of said sensitometry measurements corresponding to said recording material in the first quadrant of a graph; plotting a relation between an exposure and the logarithmic value of said exposure in the second quadrant of said graph; plotting relations between input original picture densities and output photosensitive material densities in the fourth quadrant of said graph; plotting exposure to be applied to said photosensitive material in the third quadrant of said graph; and determining numbers of pulses of said light beam for storage in said storing means in accordance with $E=N\cdot\Delta e$, where E is an exposure value, N is a number of pulses and $\Delta e$ is a unitary exposure per pulse.

7. The half-tone picture recording device of claim 3 wherein said values stored in said storing means are determined by: subjecting a photosensitive material to be utilized with said recording device to sensitometry measurements; plotting characteristic curve as a result of said sensitometry measurements corresponding to said recording material in the first quadrant of a graph; plotting a relation between an exposure and the logarithmic value of said exposure in the second quadrant of said graph; plotting relations between input original picture densities and output photosensitive material densities in the fourth quadrant of said graph; plotting exposure to be applied to said photosensitive material in the third quadrant of said graph; and determining values representing the width of pulses of said light beam for storage in said storing means in accordance with $T=N\cdot\Delta t$, where T represents an output pulse width, N is the number of pulses and $\Delta t$ is the period of said pulses.

8. The half-tone picture recording device of claim 3, wherein said storage means comprises a PROM.

* * * * *